(12) United States Patent
Liang

(10) Patent No.: US 7,780,081 B1
(45) Date of Patent: Aug. 24, 2010

(54) SYSTEM AND METHOD FOR SECURITY PROTECTION, INVENTORY TRACKING AND AUTOMATED SHOPPING CART CHECKOUT

(75) Inventor: Robert C. Liang, Tucson, AZ (US)

(73) Assignee: RCL Products, Inc., Tucson, AZ (US)

( * ) Notice: Subject to any disclaimer, the term of this patent is extended or adjusted under 35 U.S.C. 154(b) by 1003 days.

(21) Appl. No.: 11/305,993

(22) Filed: Dec. 17, 2005

Related U.S. Application Data

(60) Provisional application No. 60/641,287, filed on Jan. 3, 2005.

(51) Int. Cl.
*G06K 15/00* (2006.01)
(52) U.S. Cl. .......................... 235/383; 235/385; 705/26
(58) Field of Classification Search ................ 235/381, 235/383–385; 340/572.1; 705/26, 414; 348/156
See application file for complete search history.

(56) References Cited

U.S. PATENT DOCUMENTS

| | | | | |
|---|---|---|---|---|
| 5,418,354 | A * | 5/1995 | Halling et al. | 235/383 |
| 5,635,981 | A * | 6/1997 | Ribacoff | 348/156 |
| 5,918,211 | A * | 6/1999 | Sloane | 705/16 |
| 6,659,344 | B2 * | 12/2003 | Otto et al. | 235/381 |
| 6,725,206 | B1 * | 4/2004 | Coveley | 705/414 |
| 7,337,960 | B2 * | 3/2008 | Ostrowski et al. | 235/383 |
| 2003/0144793 | A1 * | 7/2003 | Melaku et al. | 701/209 |
| 2003/0200152 | A1 * | 10/2003 | Divekar | 705/26 |
| 2004/0181463 | A1 * | 9/2004 | Goldthwaite et al. | 705/26 |
| 2004/0252025 | A1 * | 12/2004 | Silverbrook et al. | 340/568.5 |
| 2005/0073416 | A1 * | 4/2005 | Mathewson et al. | 340/572.1 |
| 2005/0099298 | A1 * | 5/2005 | Mercer et al. | 340/572.1 |

* cited by examiner

*Primary Examiner*—Thien M. Le
*Assistant Examiner*—Sonji Johnson
(74) *Attorney, Agent, or Firm*—BAIPG, LLC; Martin D. Moynihan; Robert C. Liang

(57) ABSTRACT

The three major problems of retail/wholesale industry, i.e. Security, Inventory, Self CheckOut (SISCO) are achieved by "virtual salesperson" and provided by synergism techniques of 5W's (Weight, Who, What, Where and When). A system that includes combination of steps and/or means for uniquely identifying each and every product (UPC/USID indicium), at a vendor retail premises; steps and/or means for protecting the product/property (brain-like recognition); steps and/or means for detecting/registering a product at a vendor retail premises that has been taken from its storage or display location; steps and/or means for registering that the product has been put into a customer's shopping cart; steps and/or means for tracking customer's location with a unique ID tagging wireless device to a shopping cart; steps and/or means for automatically transacting a purchase of the product, steps and/or means for paying for the product at the vicinity of the products location with laptop/net computers at both ends of exit aisle and/or more computers at convenient places with attached scanner and card payment device; steps and/or means for notifying the customer to pay if the product has not been properly or timely paid for; any missed/unwanted items will be accounted for at reduced manned checkout stations, to received itemized purchases receipt and to sign signature, and steps and/or means for customer ID checking in and checking out by "security guard" wirelessly scans customer's receipt for inventory/security tracking.

20 Claims, 4 Drawing Sheets

Automated Checkout Flow Chart
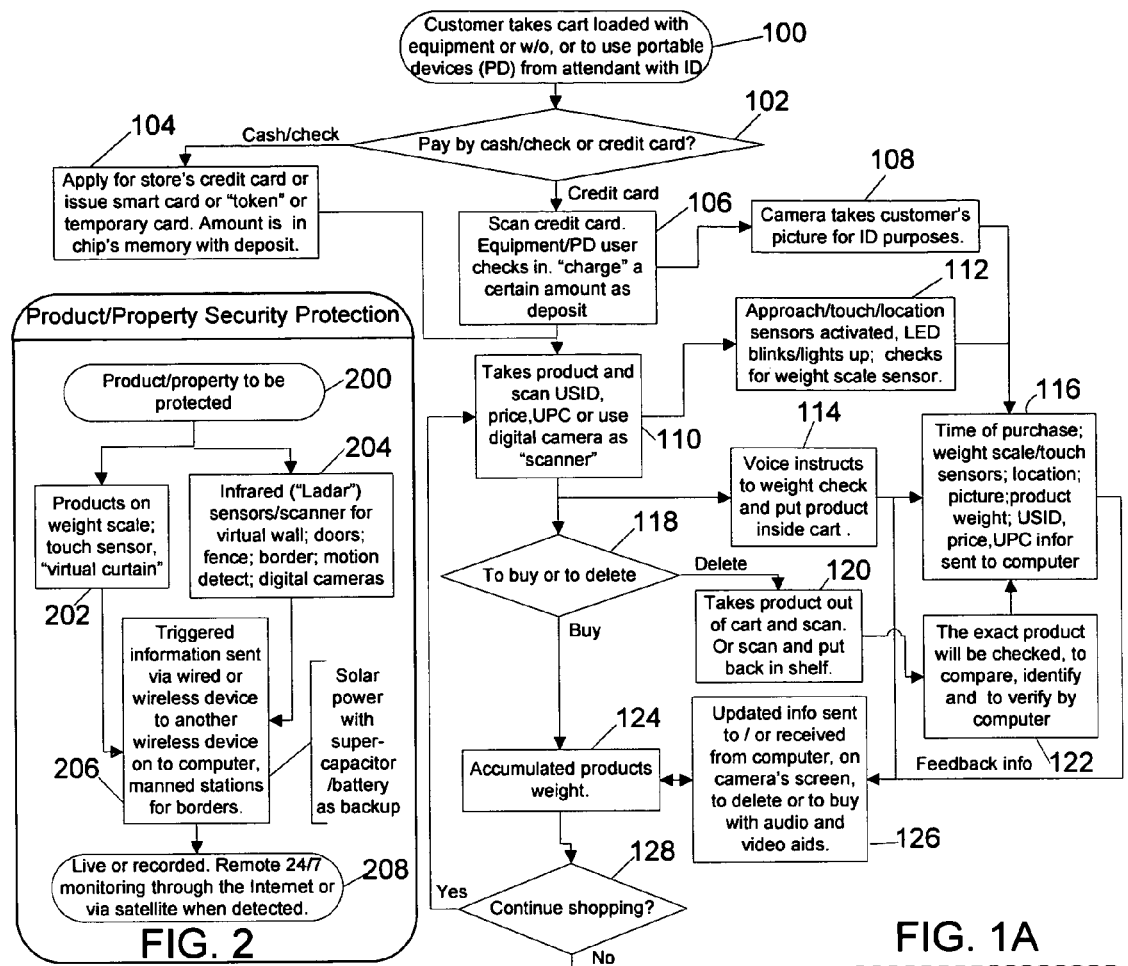
FIG. 2
FIG. 1A
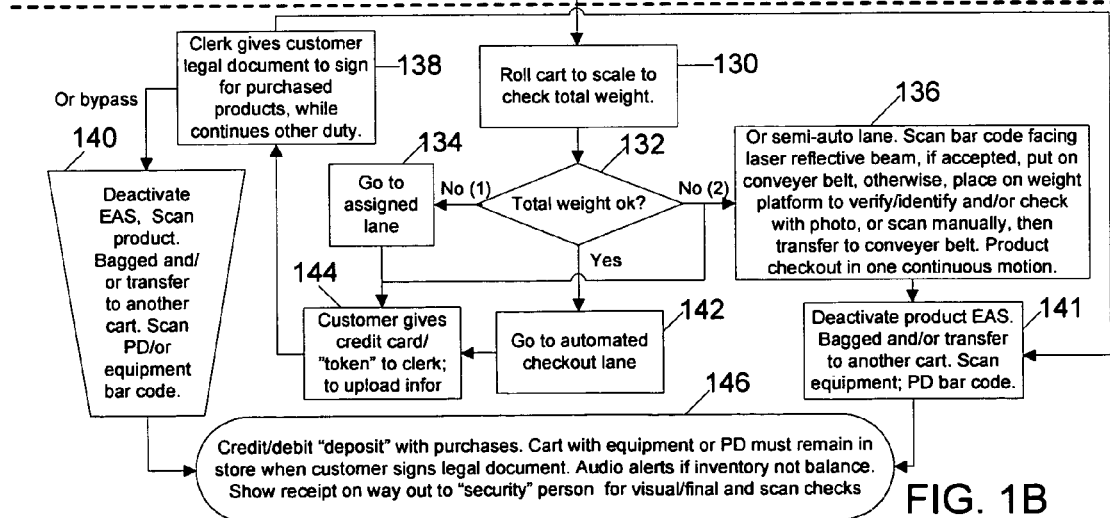
FIG. 1B

SYSTEM AND METHOD FOR SECURITY PROTECTION, INVENTORY TRACKING AND AUTOMATED SHOPPING CART CHECKOUT

CROSS-REFERENCE TO RELATED APPLICATIONS

The present Utility patent application claims priority benefit of the U.S. provisional application for patent No. 60/641,287 filed Jan. 3, 2005 under 35 U.S.C. 119(e).

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

FIELD OF THE INVENTION

The present invention relates generally to product/property protection, real time inventory tracking and shopping checkout systems. More particularly, the invention relates to automated self-checkout systems.

BACKGROUND OF THE INVENTION

Shopping for products and goods at large warehouse and department stores has grown in popularity. Many attempts have been made to improve the flow of customers and products through these stores. Under conventional product checkout methods, the customer must wait in long lines and suffer the "bottle neck" effect at the checkout counter.

Recently stores have tried to reduce the "bottle neck" effect by introducing "self check-out" schemes that incorporate scanners to allow customers to checkout their own merchandise. These new schemes have had limited success and do not adequately improve shopping cart checkout efficiency. Long checkout lines still exist during peak hours.

Yet another problem with current checkout methods is the lack of adequate security measures. Some stores provide security tags on each product. Store personnel must deactivate security tags before a customer leaves the store. If the security tag is not deactivated and a person attempts to remove a product from the store, an alarm will sound. In yet other cases, stores that do not have security tags must lock up expensive products in a protected cabinet and have an attendant unlock the cabinet when a customer shows interest. These methods of product security are inefficient and require the intervention of store personnel.

In view of the foregoing, there is a need for improved techniques that provide automatic product recognition, product security and efficient checkout of products before a customer leaves the store.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A and FIG. 1B illustrate an exemplary flow chart of one automated checkout method in accordance with an embodiment of the present invention;

FIG. 2 illustrates an exemplary flow chart of a method to securely protect products, in accordance with an embodiment of the present invention;

Figure 3:
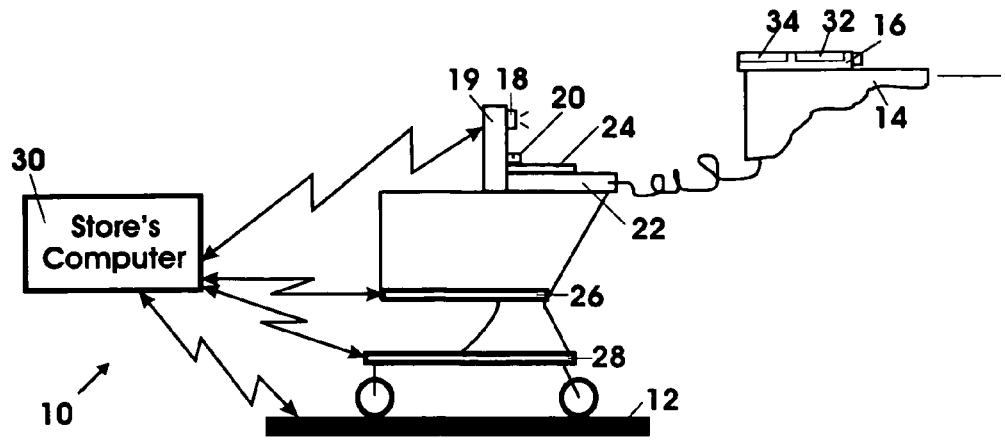
FIG. 3 illustrates by way of example the embodiment of FIG. 1, a conventional shopping cart adapted for use in an embodiment of the present invention.

Unless otherwise indicated illustrations in the figures are not necessarily drawn to scale.

SUMMARY OF THE INVENTION

To achieve the forgoing and other objects and in accordance with the purpose of the invention, a variety of techniques for product/property security protection, inventory tracking and shopping cart checkout are described.

A system for security protection, inventory tracking and shopping cart checkout is provided that includes steps and/or means for registering a product at a vendor retail premises that has been taken from its storage or display location, steps and/or means for registering that the product has been put into a customer's shopping cart, steps and/or means for automatically transacting a purchase of the product, steps and/or means for paying for the product; and steps and/or means for notifying the customer to pay if the product has not been properly or timely paid for.

Some embodiments may further include any combination of: steps and/or means for tracking products within the vendor's premises; steps and/or means for alerting a security guard representative or system of a person and/or product that is being removed from the vendor location without being paid for; steps and/or real-time means for accounting for product inventory that is being tracked by the product tracking means; steps and/or means for tracking customers and customer's location within the vendor's premises; steps and/or means for uniquely identifying at least one customer within the vendor's premises; and/or steps and/or means for exchanging a customer's credit card deposit or secured money deposit with a token that may be used in the payment means.

In another embodiment of the present invention, a system for premises security is described that includes means for tracking and registering at least one unauthorized person within the premises, means for tracking and registering the unauthorized removal of at least one item within the premises, and means for alerting a security guard representative or system of an unauthorized person and/or unauthorized item removal based on said person and/or item tracking means.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments.

In one embodiment of the present invention, the system for product protection and identification may use many types of computerized functions available on the market today. Some of the system functions include but are not limited to wireless communication technologies such as Wireless Local Area Network (WLAN) and Wireless Personal Area Network (WPAN) that may include Bluetooth, Infrared-irDA and NFC-near field communications. Other wireless networks and protocols such as Wireless Fidelity (WI-FI) may also be used between the customer and computers. The present invention may also include Electronic Article Surveillance (EAS) tags, Global Positioning System (GPS) and Radio Frequency Identification (RFID).

FIG. 1A and FIG. 1B illustrate an exemplary flow chart detailing a process of selecting products using an automated shopping cart and a process of automated checkout, in accordance with an embodiment of the present invention. The shopping process begins at 100 in FIG. 1A when customers enter the store and takes a shopping cart. The shopping cart may be equipped with electronic equipment comprising of a bar code reader, digital cameras, a computer with a WI-FI interface, a digital scale platform, a GPS unit and an RFID unit. When a customer takes a cart, they must approach the attendant to record their identification and be charged a temporary security deposit in exchange for the "loaded" cart in use while shopping.

After receiving the cart at 100, the customer makes a choice at 102 to either pay by cash/check or by credit card. If the customer decides to pay by cash/check they can be offered incentives or an application for a store credit card or "token" at 104. If the customer pays by credit card, their card will be scanned. The customer starts the shopping process by turning on the shopping cart computer at 106. The cart computer now begins to communicate with the store computer. In some embodiments of the present invention, when turned on, the cart computer will take the customer's picture at 108 for identification and send it to the store computer with a time stamp at 116.

The customer begins shopping by selecting store products, scanning the product bar code with the cart bar code reader, weighing the product and taking the product picture with the cart's digital camera at 110. The cart computer will transfer product information along with product weight at 112 to the store computer and include a digital time stamp at 116. The store computer at 116 contains product information on every item in the store that includes but is not be limited to 2D or 3D pictures, weight of each product and quantity of each product in the cart. The store computer preferably maintains suitably accurate time (e.g., without limitation, atomic time) for digital time stamps and data on special products residing on weight scale sensors throughout the store. Some embodiments of this invention will have the ability to present a digitized voice to the customer. By way of example, without limitation, the cart computer could use the digitized voice to instruct the customer at 114 to put the product in the cart.

During the shopping process, a customer may decide to purchase a product by placing it in the cart at 118 or they may remove a product from the cart. Each time a product is inserted or removed from the cart at 118 electronic devices on the shopping cart detect weight differences and record these differences with the store computer. If a customer removes a product from the cart at 120, the cart computer will attempt to identify the removed item by comparing product weights at 122 that have been previously placed in the shopping cart. When the cart computer determines which product was removed at 122 it updates the store computer with a time stamp at 116. Both the cart and store computers are updated after each transaction and the information is echoed back to the customer using voice messaging at 126. Each time a customer selects another store product, the product weight is accumulated at 124, recorded by the cart computer and transferred back to the store computer at 126. Mechanisms in the shopping cart continue to monitor the customer's shopping process at 128 until the customer has completed selecting products at 110 and moves the cart to the checkout line.

FIG. 1B is an exemplary flow chart illustrating the process of automated checkout, in accordance with an embodiment of the present invention. After the customer has completed their shopping, they roll the cart to a scale at 130 to check the total weight. The cart computer knows the individual product weights, adds this to the weight of the cart and compares it at 132 with the weight determined by the floor scale. If the two weights agree, the customer goes directly to the checkout lane at 142. If the two weights do not compare, the customer goes to an assigned checkout lane at 134. At this point the customer can chose to go to an attended checkout lane or to a semi-automatic checkout lane. If they choose an attended lane, the customer gives their credit card to the clerk at 144 and the cart information is uploaded to the register at the checkout lane. Next, the clerk gives the customer a receipt or presents them with a charge slip at 138 for the customer's signature. The clerk deactivates the EAS tags, scans the customer's merchandise and transfers it to a normal cart at 140. At the end of the checkout process, the cart with the electronic equipment remains in the store at 146, the customer receives their receipt and the checkout transaction is finished.

The customer may decide to go to a semi-automatic lane at 136 to checkout their merchandise. In this case they would remove each product from the electronic shopping cart and scan each bar code one by one. After scanning, the customer would transfer the product to a conveyer belt. Alternatively, the customer could place each product on the checkout platform and the semi-automatic lane could weigh, scan and photograph each item at 136. After all the merchandise has been identified and paid for, the semi-automatic lane will deactivate the EAS tags at 141. The customer can bag the merchandise and transfer it to a normal cart for removal from the store. The checkout transaction ends at 146 when the computer in the semi-automatic lane generates a receipt for the customer.

In another embodiment of the present invention, if customers want to buy only a few items and do not need a cart, they can approach an attendant to present cash/check, credit card, or any other suitable form of payment, including but not limited to, gift cards, smart cards, or ID chip "tokens", etc., and be charged a small "deposit" in exchange for portable bar code reader and wireless communicating devices or any suitable device needed for the transaction. The "deposited" amount will be returned or accounted for with the purchases at the check out counter. By way of example, without limitation, the customer could be given a device such as an ID chip "token" that is password protected by the customer. The ID chip "token" could contain serialized numbers of each product at the store in its large memory. If the token is lost, while at the store, it can be replaced immediately. The customer would surrender the token when all its stored monetary value is used up. Alternatively, the ID chip "token" could be filled with a prepaid amount of money and reused each time the customer returns to the store.

In some implementations of the present invention, when checking in, besides signals input to the computer's memory automatically from motion sensors, weight platform in floor, digital camera, time of entry, laser beam interruption etc., by the customer when he/she enters the store, he/she may be greeted by a "welcome" person who will direct them to register to get the "shopping tools" on loan with deposits on their credit card or exchange with a "secured money" token. This token can replace "gift cards" as a more durable, portable "piggy bank" and safe. This check-in registration helps account for that person in the store during shopping hours. All public access rooms, including restrooms, also may include entry counting scheme for security reasons.

In yet another alternate embodiment of the present invention, the customer ID chip "token" could be used to account for payment on all purchases at the checkout counter. When the customer is ready to check out, they could present the "token" to the cashier. In turn, the cashier could connect the "token" to a computer interface "adapter" to communicate with the computer. The "token" could upload all purchase information to the computer so that any missed paid items, "deposits" to credit or debit from credit cards is done by the computer at this counter. When everything is accounted for, a receipt is issued for customer's signature (e.g., without limitation, manually or electronically) to finalize the transaction. The sales receipt can be used as proof of paid purchases and be presented to the "second" layer security "guard" to visually check the merchandise before it leaves the store. The use of a "token" will help to deter thefts and to further assist in balancing the store's inventory. In some alternative embodiments, the "token" is like a "gift card" but more capable; e.g., without limitation, it is reusable (money added or subtracted), customize and password secured. If lost, it is preferably replaceable, and for a person who finds it, it has no value or useful purpose. In some applications they can, however, return it to the store for small reward and recycle.

FIG. 2 illustrates an exemplary flow chart detailing a process of product protection at night when no security guards are in the store. The process starts at 200 where specific expensive products can be protected by being placed on special modular weight sensors and proximity/touch sensors at 202 and/or motion detecting "virtual curtain". If any of these special products are removed from their location, the computer is notified either by hard wire or by way of a wireless interface at 206. The store and its contents can also be protected at night using active infrared sensors at 204 that scan areas in front of store entranceways. Intruders can be detected at night at 204 using passive motion detectors along with stationary or moving cameras. If the motion detectors or the infrared area scanner detect movement the computer is notified via hard wire or wireless computer interface. The night detection system can be equipped with a constant recorder at 208 and it can have remote monitoring capability via the Internet. If any intrusion is detected, the store computer can immediately send alarm to a security service provider in the local area.

FIG. 3 illustrates by way of example a conventional shopping cart 10 adapted for use in an embodiment of the present invention. The shopping cart 10 is equipped with electronic equipment comprising of a bar code reader 14, a credit card scanner 20, a cart computer 22 with a WI-FI interface and other USB interface connections that allow the cart to be in constant communication with a store computer 30. The shopping cart 10 may also contain digital cameras; such as, without limitation, a camera with display 16 that is connected to the cart with a cord to prevent loss or theft, and a stationary camera 18 for taking identification pictures. The shopping cart 10 may also have multiple scales 24 and 26 built into the cart platform to check the total weight of products in the cart and to average the result with software. The shopping cart 10 also contains a scale 24 for weighing products before they are transferred to the interior of the cart. A camera screen 32 or the cart computer 22 screen can tell the customer the name, quantity and cost of each product in the cart.

The customer begins the shopping process by selecting a store product and scanning the product's bar code with code reader 14. Simultaneously a camera 16 takes the product's picture and sends this information to the store computer 30 via wireless interface. The cart computer 22 may instruct the customer, using digitized voice, to put the product on weight platform 24 and then place it inside the cart. Now cart computer 22 can transmit the product weight information to store computer 30. In some embodiments, bar code reader 14 is a reflective bar code scanner that is wirelessly linked to store computer 30. Upon a successful bar code scan, cart computer 22 accepts the product with a sound such as a "beep" and then the consumer is instructed to place the product onto weight check platform 24. If the weight check is successful, cart computer 22 signals feedback with another "long beep" and the customer is instructed to transfer the product into the cart. When the customer selects the "buy" button on keypad 34 or presses one of the assigned keys on computer 22, the scanned and weighed product is considered "sold". An accurate time stamp is also recorded. If the customer changes their mind and wants to return the product to the shelf, they can do so by taking the product out of the cart, scanning the barcode again and placing the product back on the shelf. When this occurs, the subtracted weight from scales 26 and 28, and recorded time of execution data are transmitted to the store computer 30. The store computer 30 will compare, identify and feedback information to camera screen 34 that a removed product has been "deleted" from the contents of shopping cart 10, audible communication means may also be used.

Normally, the weight and barcode are sufficient for the cart computer 22 to identify the exact product. However, to prevent fraud, or when weight information is in doubt, accurate and precise timing is another tool the computer can use to verify and identify the exact product. By way of example, without limitation, if two different products weigh the same, each product can be distinguished from one another because the exact time of each purchase was different. If two different products with the same weight are thrown into the cart at the same time without first being scanned, cart computer 22 may prompt the customer with digitized voice or audible beeps to rescan the products. In the case that the customer wants to buy or return one or more of the same product, or do something out of the ordinary, the cart computer 22 can prompt the customer via screen 32, and the customer can take appropriate actions to solve the problem.

When the customer is ready to checkout, they can roll the shopping cart 10 to weight all of the products including the cart on a weight platform 12. The store computer 30 will subtract the weight of the cart and if the weight of the products in the cart is correct, the customer proceeds to an automated checkout lane. If there is a recognizable weight difference, the cart computer 22 can give the customer feedback using the cart computer's screen or by prompting the customer using a digitized voice to proceed to a manual lane where the products in the cart can be scanned individually to check for missed or added items.

At the checkout counter, the clerk can upload the purchased product information from the customer's charge card and present them with a document for signature. At the same time the clerk can deactivate the EAS tag(s) affixed to the products, bag the products, and transfer the bagged products to a conventional cart not equipped with the present invention. The purchase is automatically charged to the credit card that was scanned into credit card scanner 20 and then the customer is given a receipt to sign at the final checkout. Customer information entered at the start of shopping, the picture ID taken by security camera 18, and the shopping cart check-in verification data, are recorded automatically by the cart computer and send through a wireless interface to the store computer 30.

In another embodiment of the present invention, the cart computer 22 may be implemented as any suitable mobile platform including, but not limited to, wireless computers such as personal data assistants (PDA), laptop, mobile phones with display, or video digital cameras. That is, any computer with a wireless communication means and a display with peripheral attachments are suitable to carryout the cart computer functions of the present invention.

Figure 4:
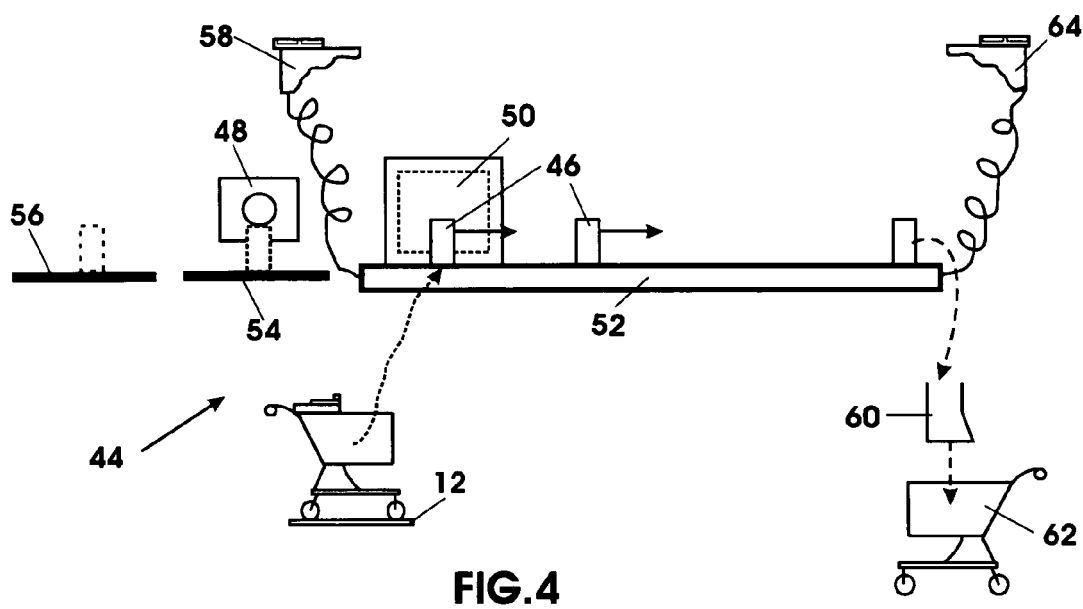
FIG. 4 illustrates by way of example a semi-automatic lane that the customer may choose to use instead of a manual lane; and, FIG. 5 illustrates by way of example, an alternate embodiment of the present invention that provides security theft protection. The corresponding method is illustrated by way of example in the exemplary flow chart described in FIG. 2.

FIG. 4 illustrates by way of example a semi-automatic lane that the customer may choose to use instead of the manual lane. The customer begins the checkout process in the semi-automatic lane 44 by taking a product 46 from the loaded cart and scanning the product barcode facing a reflective laser beam scanner 50. If the store computer 30 in FIG. 3 accepts the product scan, with an audible beep for example, without limitation, the customer then puts the scanned product onto conveyer belt 52. If the store computer does not accept the product scan, the product is placed on top of weight platform 54. The product can be verified by having its weight checked. Additional verification and identification checks may be added, by way of example, without limitation, by comparing the picture of the product taken earlier to the image captured by video camera 48. If the product is accepted, it is transferred to conveyer belt 52. If the product is not accepted by the store computer, it can be transferred to another platform 56 next to conveyer belt 52, for the clerk to attend to later. Alternatively, the customer may scan the product manually using barcode scanner 58, put the product(s) into bag 60 at the end of conveyer belt and transfer everything to another cart 62.

After all the products are transferred to another cart, the customer signs a legal confirmation document. Before the customer receives a sales receipt, the customer uses scanner 64 to scan the shopping cart's bar code to confirm that the equipment stays in the store. Further security can be designed into the system by having the cart computer issue an audible beep to remind the customer to scan the cart's equipment bar code. The cart with the equipment must remain in the store to be used by new customers.

Given that shopping cart 10 is equipped with relatively expensive wireless equipment, some embodiments of the cart may be designed with GPS systems, EAS, and radio frequency identification (RFID), or other suitable security measures towards that would allow the store computer to constantly monitor the location of shopping cart 10. By way of example, without limitation, if shopping cart 10 had built in sensors such as those described above, it could trigger a store alarm if the shopping cart is moved to an outside door of the store.

Figure 5:
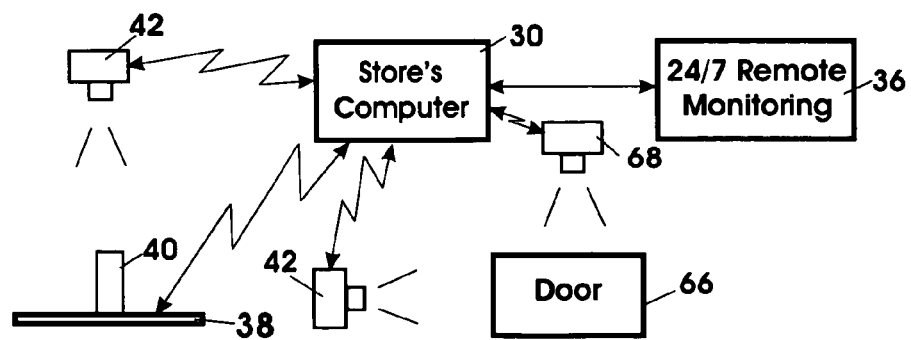

FIG. 5 illustrates by way of example, an alternate embodiment of the present invention that provides additional verification and identification checks to securely protect products as previously described in FIG. 2. Some expensive products in the store require special security measures. For these special cases, digital WI-FI modular weight scale sensors 38 can be added under selected products 40 or groups of products, and monitored by the store computer through WI-FI computer connections to determine if one of these products are removed from the shelf. When armed at night, the system shown also doubles as security against insider theft, which is known to be a source of major loss to retailers. A system alarm may also be triggered with a hidden proximity motion detecting camera 42. In the present embodiment, detected information may be sent via household power line or by wireless interface to the store computer 30.

The security system in FIG. 5 may contain multiple infrared technologies, an active component with laser beams that pulse over a broad range and a passive element that detects changes in the movement of heat. The sensors 68 are designed to scan in a large arc and provide coverage over any virtual door, wall, fence or wide open space. If any movement is detected within the active infrared beam field, an alarm can be triggered. The sensors 68 may also contain passive infrared detectors that can be triggered by a heat source such as the human body or other objects. The motion detection camera 42 has its own image sensor that can be triggered by movement of heat. The camera 42 is lightweight and small and can be moved manually or can be controlled by way of the Internet. By way of example, without limitation, if camera 42 detects movement of heat it can be programmed to automatically track the heat source with infrared sensors. Further applications of the present security systems can extend to protect other valuables like jewelry, printings, etc., by way of a real-time Internet monitoring means 36. When sensors are triggered, the store computer could remotely alert authorities to catch the intruder, or to record the act and prosecute the perpetrator later.

Figure 6A:
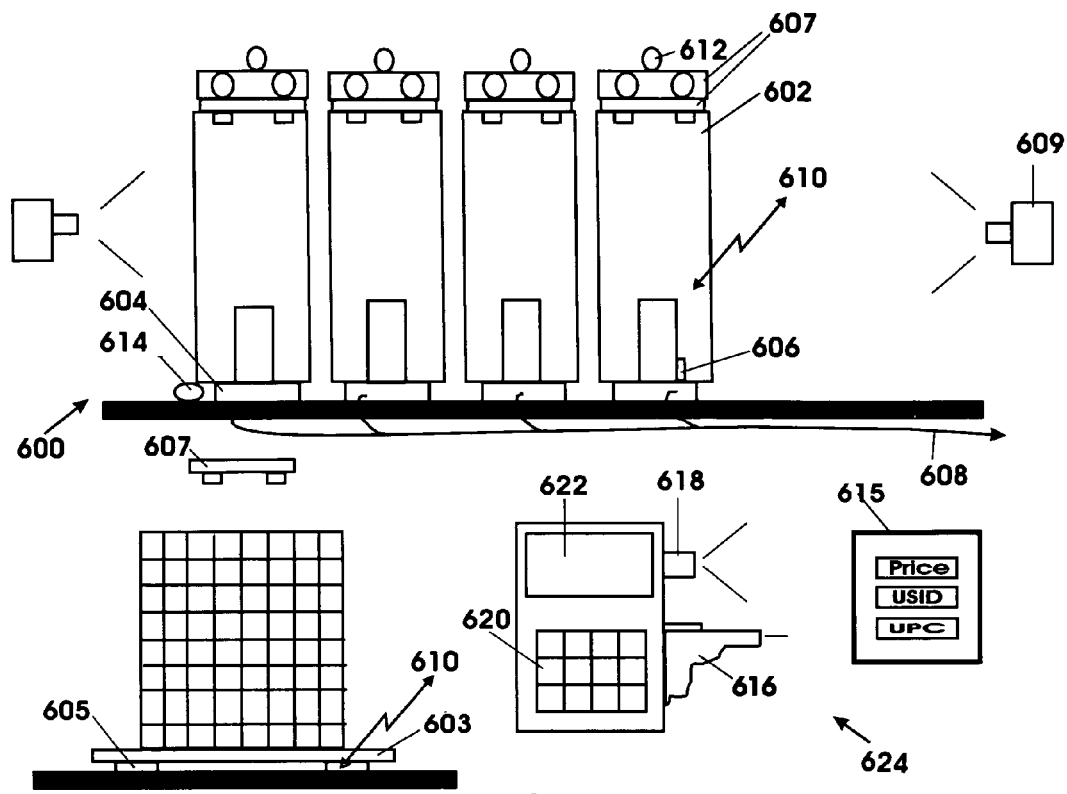
FIG. 6A illustrates another product tracking embodiment of the present invention.

FIG. 6A illustrates another product tracking embodiment of the present invention, wherein selected products 600 in the store could be armed with touch sensors 606 and/or "virtual curtain" using, by way of example, without limitation, narrow range motion detector 607 proximity sensor or laser interruption as another methods of detection/identification. As described earlier in this specification, some special products can be placed on digital weight scale sensor modules 604 in "cubical" shelves 602 that are isolated from one another. Each of these "cubical" shelves 602 or pallets 603 on four digital weight scale sensors 605 (averaged for true weight) can send information to the store computer either by hard wire ("1-wire" network) connection 608 or by wireless 610 computer interface. The store computer can keep track of the quantity and location of each special product through the touch sensors 606 and/or "virtual curtain" motion detector 607 (use also for pallets) or track the entire row of products with "virtual wall" laser/motion detector/sensor 609, and digital weight scale sensors 604. If one of these special products is approached, touched or removed, the store computer will detect it and set off shelf indicators 612 such as a visual or audio beep at that product location. In another embodiment of the present invention, all the same type products in the store are assigned a unique serial identification (USID) number along with the UPC bar code and these identifiers could be attached to each store product. The manufacturer could also provide this service, and by way of example, without limitation, provide product tags printed in a "two dimensional" scheme with the UPC bar code and USID number below or above it. Since product pricing is mandatory required by state or city, USID numbering for each same product by store's personnel is done at the same time with pricing, thereby no additional time is needed. When a customer wants to purchase one of the tagged products, the store computer can cross check the codes with stored product information. The potential purchasing product information comes from that may include hand approaching motion, proximity and/or touching sensor signals exact time of event/purchase stamp, product weight, product image, product location, price, UPC bar code and USID number etc. After product identification is confirmed and the customer has decided to purchase the product, he/she can use the ID chip "token" described earlier, to make contact with a computer interface "adapter" 614 located in the vicinity of the products. The computer can respond to the customer that the product is paid for with audio or visual 622 feedback and at the same time, turn off any visual alarms such as a store shelf LED indicator light 612. If a customer forgets to use their ID chip "token" to alert the computer of their purchase, the alarm LED 612 will continue to light up. The computer knows a product has been removed from a shelf and registers a warning message to the security guard through a wireless communication interface that the product has not been paid for and it must be accounted for at check out. Alternately, the product can be paid in the usual way wirelessly with handheld device 624.

In some implementations of the present invention, after all the customer's purchased items have been accounted for at the checkout station, the receipt issued is to contain bar-coded ID of the customer. The "security guard" performs like a "thank you for shopping here" person (less intimidating, more friendly gesture), will scan the receipt's ID code wirelessly and account for customer as checking out, who will be deleted from the computer's memory and final conclusion of the transaction. This procedure is the "second" level of security when or if any items are not paid for, alert by computer to watch-out.

In another embodiment of the present invention and by way of an alternative example, without limitation, it may be preferable to design and build the UPS bar code scanner 616 along side with a camera 618 to capture the USID number both at the same time and process by computer software. By this one action, the computer will feedback information 622 and confirmed this unique product the customer may want to buy. If so, the customer needs to do is to press "buy" button in a keypad 620 and the product is recorded paid for.

By way of another alternative example, without limitation, payment can be made using the customer's own cell phone or PDA or similar wireless device. The computer will accept this form of payment as long as the customer identification information is authentic and has been confirmed when they first enter the store.

With this embodiment of using multiple product identification such as hand approaching motion, proximity and/or touch sensors, product weight/location, exact time of event/purchase, the USID number of each same product, etc. and other identifiers as mentioned earlier, this process could save a lot of time. Since most of the products purchased had been self-checked out at point of product location by the customer and cross-checked by computer, speed at the checkout station can be gross checked only by visual, total weight checking and upload all customer's information to cross check against store's inventory and to issue itemized sale receipt with weight information (each item and total). Store clerk is to concentrate more on missed items and other discrepancy from store's inventory. Inventory is in real time.

The USID is contemplated to be a viable alternative to RFID, which USID is believed to be cheaper, effective, efficient, accountable and traceable. When products delivered to the store from manufacturer or supplier, each item is preferably numbered with a USID (unique serial identification). The USID can contain alphanumeric symbol, by way of example, and not limitation, the month, serial number and year. This serial numbering can be recycled and repeated when all that same item of products delivered have been sold. This USID is preferably to be placed in each item below or above the price and UPC of each item so it is easy to take picture and bar scan at the same time. The procedure is preferably made friendly, fast, easy to use, and fun to shop. The computer does the work of accounting for every item in the store, sold or otherwise with the aid of all the identification mentioned; e.g., USID, weight of the product, time of purchase, hand approaching product motion sensor, proximity/touch sensor, product location, image of the product/customer etc., to check, to counter check each item, and balance the inventory.

USID can be any way implemented: by using bar code, alphanumeric (as mentioned earlier), pure numbers, any symbols (Chinese, Greek or any language), or whatever characters that the computers have stored in its memory bank to be compared, matched, verified, identified and recognized.

The single common "synchronized" atomic clocking or timing of all events/purchases, by way of example, without limitation is one of the important tools in this invention. Other timing sources can be quartz oscillators or from any timing sources, but must reset and synchronize with all the shopping tools or equipments, at the beginning of the day for example, automatically.

Multiple RF trans-receiver "satellites" equipments are located at high corners of vendor's building. They are to be used to track customer's location. The customer's shopping cart or portable device (PD) is the "beacon". It is like GPS but in localized scale.

In another embodiment of the present invention and by way of an alternative example, without limitation, the customer's location can be determined when he/she is approaching the "cubicle" or product location. The customer's unique ID shopping device's (assigned when first enter the store) emitting signal is picked up with the strongest by the trans-receiver (use in motion detector/laser) will be the customer's position. When the customer's approaching hand for the product triggered the sensor, the store computer now knows who got hold of what, where and when the product was taken. When the "4w's" is confirmed by store computer on the product, it is now ready for scanning to final homing in to the uniqueness of the product with USID and ready to purchase and accounted for. When weight is added for further identification, then "5w's" will definitely identify the exact product.

It is possible for the computer to recognize all of the three codes (price, USID and UPC bar code printed above or below to each other) at the same time of the product 615 from camera 618 photo image send wirelessly to be processed by software algorithms. Once the purchasing product is identified and recognized, the transaction is confirmed and feedback to the handheld device 624 use by the customer at the product location. When this wireless digital camera 618 can do the job alone, the bar code scanner 616 is no longer required or needed.

Figure 6B:
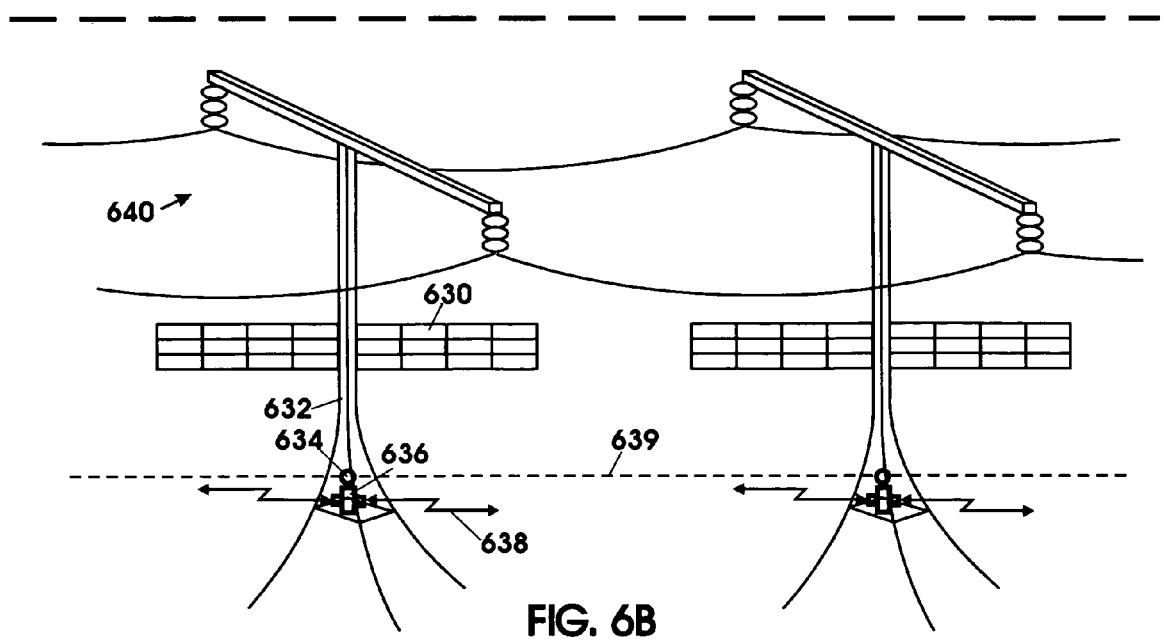
FIG. 6B illustrates an exemplary outdoor premises security embodiment of the present invention.

FIG. 6B illustrates an exemplary outdoor premises security embodiment of the present invention. In accordance with the teachings of the foregoing embodiments, the present invention may also be configured into alternate embodiments that address a wide variety of alternate and suitable applications, such as; without limitation, security protection for bigger indoor areas or peripheral areas of warehouses, buildings, construction sites, farms and very long open spaces. Laser radar systems or "Ladar" 634 are good for beam interruption or obstacle detection. By way of example, without limitation, wide and very long open spaces along borders can be protected by installing security towers 632 at intervals along the border, essentially creating a seamless "virtual wall". The towers 632 could support Ladar systems 636 and solar panels 630 to power the equipment. Any excess energy from these panels could be distributed back into the local power grid or stored in nanotube supercapacitors that can either complement or replace batteries used to power the security system. Power to operate the security system could also be obtained by converting the sun's kinetic energy to potential energy that can power systems to extract hydrogen from water. The extracted hydrogen can be stored in underground tanks and piped it to where it is needed as fuel. To increase the solar operating efficiency, Stirling engines could be used. These towers 632 double as high voltage direct current (HVDC) 640 power transmission towers for delivering power from distance sources, like wind turbines, hydroelectric systems or clustered solar panels or contributing from all the solar panels installed. When the Ladar 634 equipment is turned on, radar beams 639 are emitted from one tower to the next, effectively creating a security fence along the borderlines. Any interruptions to the beam will be detected and communicated through wireless communication 638 links from one tower to the next, like a "bucket brigade" relaying information to the local manned workstations to be recorded or acted upon in real time. Computer software algorithms can analyze data from the Ladar 634 system and indicate exactly where the interruption has occurred.

Those skilled in the art will further readily recognize improved or addition verification and identification checks beyond those already described above. By way of example, and not limitation, some embodiments may include sophisticated software algorithms to enhance product identity checks and to deduce the precise product purchased or removed and deleted from the customer's cart. By way of example, and not limitation, additional customer identity checks (beyond picture, social security number, password, token, etc.), including conventional biometric means such as information from a fingerprint reader, DNA, and retina scan, etc., for customer registration. It is contemplated that this kind of information can really speed payment for products, on checking in and checking out. It is contemplated that this kind of information can be adapted into the present invention to help against identity theft as well.

The present system may be designed to be very user friendly and fun to use with audio and video aids. Moreover, embodiments of the present invention are well suited for high-traffic, high volume retail/wholesale stores, grocery stores, club member stores and other high volume product stores.

In some embodiments, customers can order their desired product(s) thru the Internet by cell phone, laptop or any applicable communication device and then pick up their products or have them delivered directly to their home.

Those skilled in the art will readily recognize, in accordance with the teachings of the present invention, that any of the foregoing steps and/or system modules may be suitable replaced, reordered, removed and additional steps and/or system modules may be inserted depending upon the needs of the particular application, and that the systems of the present embodiment may be implemented using any of a wide variety of suitable processes and system modules, and is not limited to any particular computer hardware, software, firmware, microcode and the like.

Figure 7:
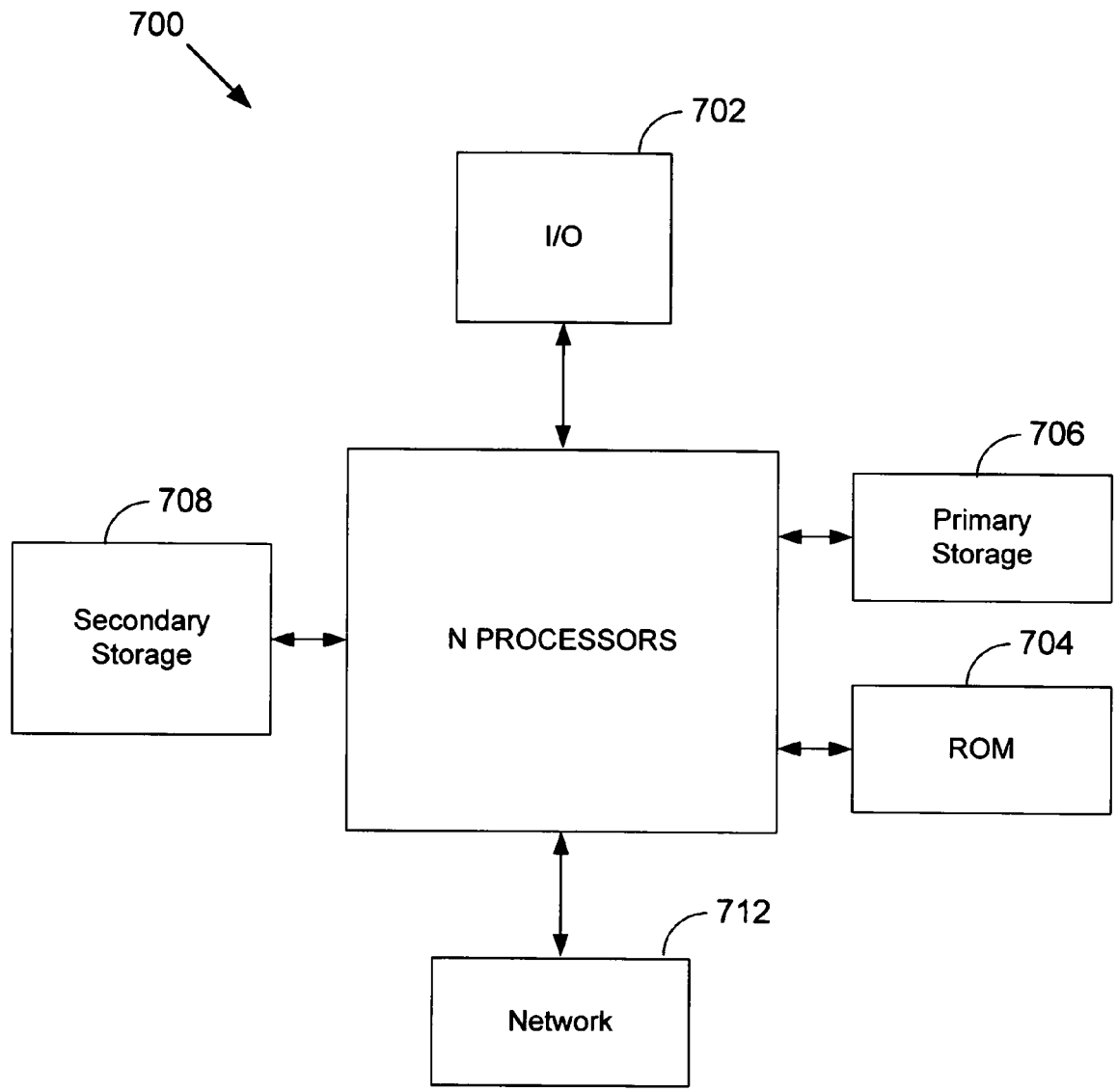
FIG. 7 illustrates a typical computer system that, when appropriately configured or designed, can serve as a computer system in which the invention may be embodied.

FIG. 7 illustrates a typical computer system that, when appropriately configured or designed, can serve as a computer system in which the invention may be embodied. The computer system 700 includes any number of processors 702 (also referred to as central processing units, or CPUs) that are coupled to storage devices including primary storage 706 (typically a random access memory, or RAM), primary storage 704 (typically a read only memory, or ROM). CPU 702 may be of various types including microcontrollers and microprocessors such as programmable devices (e.g., CPLDs and FPGAs) and unprogrammable devices such as gate array ASICs or general purpose microprocessors. As is well known in the art, primary storage 704 acts to transfer data and instructions uni-directionally to the CPU and primary storage 706 is used typically to transfer data and instructions in a bi-directional manner. Both of these primary storage devices may include any suitable computer-readable media such as those described above. A mass storage device 708 may also be coupled bi-directionally to CPU 702 and provides additional data storage capacity and may include any of the computer-readable media described above. Mass storage device 708 may be used to store programs, data and the like and is typically a secondary storage medium such as a hard disk. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 may also be coupled to an interface 710 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to an external device such as a database or a computer or telecommunications or internet network using an external connection as shown generally at 712. With such a connection, it is contemplated that the CPU might receive information from the network, or might output information to the network in the course of performing the method steps described in the teachings of the present invention.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like.

Having fully described at least one embodiment of the present invention, other equivalent or alternative methods of implementing automated shopping cart checkout and security systems according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A system for security protection, inventory tracking and shopping cart checkout, the system comprising:
   means for identifying a customer entering a vendor retail premises and issuing a unique ID tagging wireless device to a customer's shopping cart;
   means for uniquely identifying a product at the vendor retail premises with a unique serial identification (USID) indicium on a packaging of the product, where the indicium is configured for optical UPC/USID recognition, and an assigned weight of the product;
   means for registering the product that has been taken from its storage or display location using a sensor indicating the assigned weight has been removed and a digital picture of the product captured in a vicinity of the product's storage or display location where the USID is recognized along with a UPC code, and further activating an alarm at the product's storage or display location;
   means for registering that the product has been put into the customer's shopping cart where a measured weight of the product is detected in the customer's shopping cart;
   means for automatically transacting a purchase of the product while the customer's shopping cart remains in the vicinity of the product's storage or display location and the product remains in the customer's cart as determined by the detected measured weight;
   means for paying for the product in the vicinity of the product's storage or display location and deactivating the alarm;
   means for notifying the customer exiting the vicinity of the product's storage or display location to pay if the product has not been properly or timely paid for in the vicinity of the product's storage or display location;
   means for concluding the purchase transaction using the assigned weight, the measured weight, a total product measured weight and verification of payment; and
   means for verifying the customer as exiting the vendor retail premises.

2. The system of claim 1, further comprising means for alerting a security guard representative or system of a person and/or product that is being removed from the vendor location without being paid for.

3. The system of claim 1, further comprising real-time means for accounting for inventory tracking and shopping cart checkout.

4. The system of claim 1, further comprising means for tracking customers and customer's location or position within the vendor's premises.

5. The system of claim 1, further comprising means for exchanging a customer's credit card deposit or secured money deposit with a token that may be used in said payment means.

6. A method for security protection, inventory tracking and shopping cart checkout, the method comprising:
   steps for identifying a customer entering a vendor retail premises and issuing a unique ID tagging wireless device to a customer's shopping cart;
   steps for uniquely identifying a product at the vendor retail premises with a unique serial identification (USID) indicium on a packaging of the product, where the indicium is configured for optical UPC/USID recognition, and an assigned weight of the product;
   steps for registering the product that has been taken from its storage or display location using a sensor indicating the assigned weight has been removed and a digital picture of the product captured in a vicinity of the product's storage or display location where the USID is recognized along with a UPC code, and further activating an alarm at the product's storage or display location;
   steps for registering that the product has been put into the customer's shopping cart where a measured weight of the product is detected in the customer's shopping cart;
   steps for automatically transacting a purchase of the product while the customer's shopping cart remains in the vicinity of the product's storage or display location and the product remains in the customer's cart as determined by the detected measured weight;
   steps for paying for the product in the vicinity of the product's storage or display location and deactivating the alarm;
   steps for reminding the customer exiting the vicinity of the product's storage or display location to pay if the product has not been properly or timely paid for in the vicinity of the product's storage or display location;
   steps for concluding the purchase transaction using the assigned weight, the measured weight, a total product measured weight and verification of payment; and
   steps for verifying the customer as exiting the vendor retail premises.

7. The method of claim 6, further comprising Steps for tracking products within the vendor's premises.

8. The method of claim 7, further comprising Steps for alerting a security guard representative or system of a person and/or product that is being removed from the vendor location without being paid for.

9. The method of claim 7, further comprising real-time Steps for accounting for product inventory that is being tracked by said product tracking Steps.

10. The method of claim 6, further comprising Steps for tracking customers within the vendor's premises.

11. The method of claim 10, in which said Steps for tracking customers further comprising the Step of when a customer enters the vendor's premises at least one motion detector detects the customer, a weighing platform weighs the customer, and digital camera takes an image of the customer, all used to track the entering/leaving of the customer in/from the vendor's premises.

12. The method of claim 6, further comprising Steps for exchanging a customer's credit card deposit or secured money deposit with a token that may be used in said payment Steps.

13. The method of claim 6 further comprising steps for detecting a product removal at a vendor retail premises.

14. The method of claim 6 further comprising steps for comparing, verifying, and recognizing the unique product to ready for purchase and payment.

15. A system for indoor or outdoor premises security, the system comprising:
   means for tracking and registering at least one unauthorized person within the premises;
   means for detecting a removal of at least one item from its storage or display location using a sensor indicating a weight has been removed, where the at least one item has a unique serial identification (USID) indicium, configured for optical UPC/USID recognition, on a packaging of the at least one item and the USID is associated with the storage or display location, and further activating an alarm at the product's storage or display location;
   means for tracking and registering the unauthorized removal of at least one item within the premises; and
   means for alerting a security guard representative or system of an unauthorized person and/or unauthorized item removal based on said person and/or item tracking means; and means for detecting/sensing one or more unauthorized persons in open entry areas, said open entry areas to include curtains, doors, walls or one or more segments of outdoor peripheries.

16. The system of claim 15, further comprising real-time means for accounting for said at least one item that is being tracked by said item tracking means.

17. The system of claim 15 wherein the means for detecting/sensing one or more unauthorized persons in open entry areas comprise scanned beam interruption/reflection means.

18. The system of claim 15 wherein said means for detecting/sensing one or more unauthorized persons in open entry areas comprises one or more brain-like sensing systems that scan an area and detect and recognize differences between moving objects.

19. The system of claim 15 wherein the one or more segments of outdoor peripheries further comprise a protected area on one side and an unprotected area on the other side of the one or more segments of outdoor peripheries such as a protected border.

20. The system of claim 15 wherein said means for detecting/sensing one or more unauthorized persons in open entry areas are located on and receive power from one or more conveniently spaced security towers that double as power transmission towers, wherein said power transmission towers are powered from sources that include solar, wind, hydroelectric, and Sterling engine systems.

* * * * *